Figure 1:
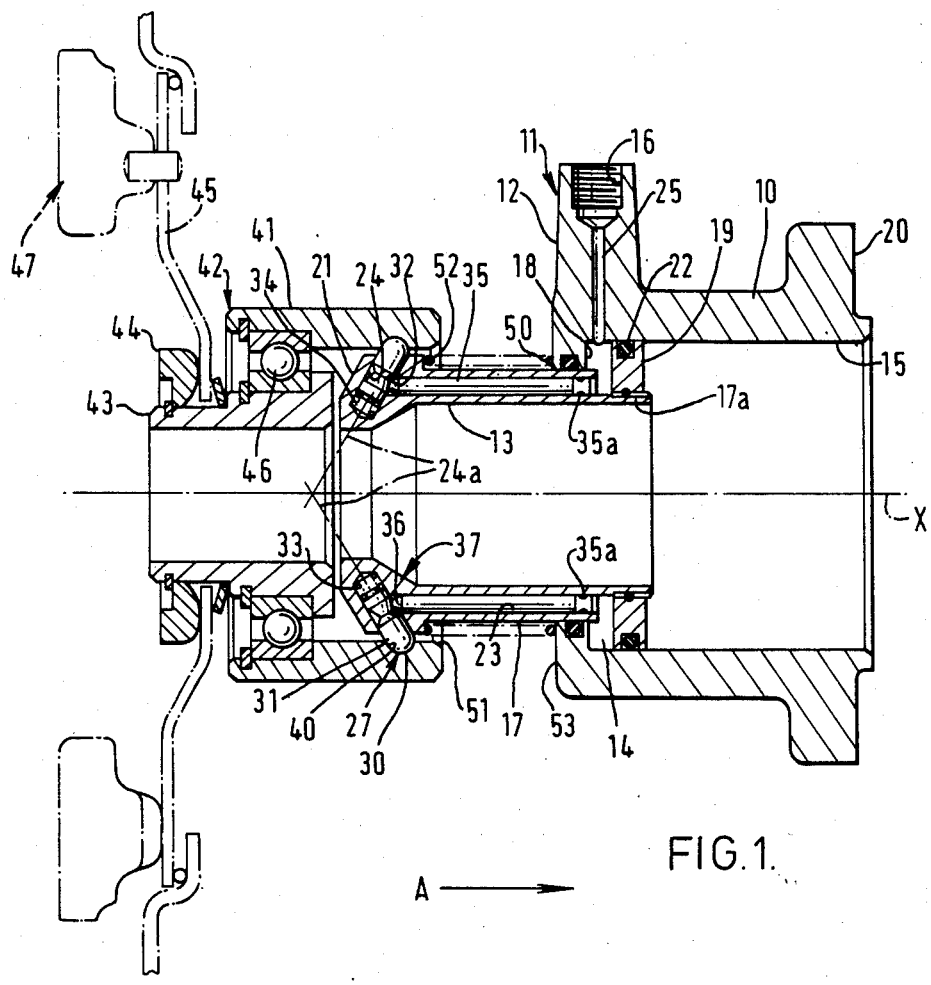

United States Patent [19]

Wimbush

[11] Patent Number: 4,691,814

[45] Date of Patent: Sep. 8, 1987

[54] CLUTCH RELEASE MECHANISM

[75] Inventor: Maurice J. Wimbush, Whitnash, England

[73] Assignee: Automotive Products plc, Leamington Spa Warwickshire, England

[21] Appl. No.: 855,719

[22] Filed: Apr. 25, 1986

[30] Foreign Application Priority Data

Apr. 27, 1985 [GB] United Kingdom ............... 8510781

[51] Int. Cl.$^4$ .............................................. F16D 25/00
[52] U.S. Cl. ............................. 192/91 A; 192/85 CA; 192/114 R; 403/31
[58] Field of Search ........... 192/85 CA, 91 A, 114 R, 192/70.13, 109 R, 110 B, 110 R; 403/31; 285/18

[56] References Cited

U.S. PATENT DOCUMENTS

| 2,076,635 | 4/1937 | Halstead | 192/44 |
| 3,380,565 | 4/1968 | Wilkinson | 192/58 B |
| 3,972,398 | 8/1976 | Chamberlain | 192/4 A |
| 4,087,119 | 5/1978 | Capdebosc et al. | 285/18 |
| 4,116,471 | 9/1978 | Duncan et al. | 285/1 |
| 4,226,318 | 10/1980 | Morgan | 192/85 CA |
| 4,306,642 | 12/1981 | Alder | 192/114 R |
| 4,561,531 | 12/1985 | Young et al. | 192/85 CA |
| 4,579,205 | 4/1986 | Post | 192/24 |

FOREIGN PATENT DOCUMENTS

| 47-48215 | 12/1970 | Japan | 192/91 A |
| 59-1807 | 1/1984 | Japan | 403/31 |
| 2098697A | 11/1982 | United Kingdom | 192/91 A |

Primary Examiner—John E. Murtagh
Assistant Examiner—Andrew Joseph Rudy
Attorney, Agent, or Firm—Solon B. Kemon

[57] ABSTRACT

The clutch release mechanism includes a fluid actuator having an actuator member movable by fluid pressure in a clutch release direction to release the clutch, a release bearing assembly for connection to part of the clutch, and a coupling for connecting the release bearing assembly to the actuator member. The coupling is fluid operable whereby in one condition it prevents axial separation of the actuator member and release bearing assembly by engagement of pins and a groove and, in another condition, it allows axial separation and coupling of the release bearing assembly and the actuator member by disengagement of the pins and groove.

17 Claims, 2 Drawing Figures

CLUTCH RELEASE MECHANISM

This invention relates to a clutch release mechanism for a clutch in which an actuator member is connected by a disengageable coupling to the clutch.

An example of such a mechanism is a release mechanism for a pull release type clutch for an automobile where it is a requirement for the actuator member to be uncoupled from the clutch to allow the engine and transmission units to be separated for servicing or repair.

It is usual for such a clutch to be housed in a housing joining the engine to the transmission as a consequence of which accessibility of the clutch and release mechanism is very limited.

It is an object of this invention to provide a clutch release mechanism in which the actuator member can be coupled or uncoupled from the clutch without requiring access to the disengageable coupling.

According to one aspect of the invention there is provided a clutch release mechanism including a fluid actuator having an actuator member movable by fluid pressure in a clutch release direction to release the clutch, a release bearing assembly for connection to part of the clutch, and coupling means for connecting the release bearing assembly to the actuator member, said coupling means being fluid operable whereby in one condition it prevents axial separation of the actuator member and the release bearing assembly and in another condition it allows axial separation and coupling of the release bearing assembly and the actuator member.

In said one condition the coupling means may, in one case, be lockable by fluid pressure to prevent said axial separation. In said other condition, the coupling means may be unlockable by relieving fluid pressure to allow said axial separation and coupling.

In another case, the coupling means in said one condition, may be lockable by relieving fluid pressure to prevent said axial separation. In said other condition, the coupling means may be unlockable by fluid pressure to allow said axial separation and coupling.

Preferably, said coupling means is operable by fluid pressure in said fluid actuator.

The coupling means may comprise at least one movable latch member, e.g. a pin, supported by the actuator member and latch engaging means on the release bearing assembly. The latch engaging means may comprise a circumferential groove, a recess or an aperture. The or each latch member may be movable transversely of the longitudinal axis of the actuator member. For example, the or each latch member may be movable radially or along an axis inclined to the longitudinal axis of the actuator member. The or each latch member may be co-operable with a fluid pressure movable means. In said one case, the or each latching member may be lockable in engagement with the associated latch engaging means by its associated fluid pressure movable means to prevent axial separation of the actuating member and the release bearing assembly in the direction of release of the clutch.

In said other case, the operation of the or each movable means may be arranged to urge its associated latch member out of engagement with the latch engaging means.

The movable means may be movable substantially parallel with the longitudinal axis of the actuator member.

The movable means may comprise at least one axially movable plunger supported by the actuator member. Preferably, each plunger has a tapered end portion for co-operation with a respective said latch member.

Conveniently, the or each latch member may be in the form of a pin.

In said one case the or each latch member may have a frusto-conical portion for co-operation with the tapered end portion of the co-operable plunger to enable the plunger to lock the latch member into engagement with the respective latch engaging means. In the other case, the tapered end portion of the co-operable plunger may be arranged to urge the latch member out of engagement with the associated latch engaging means.

The or each latch member may have a part spherical end portion for co-operation with the associated latch engaging means.

The or each latch member may be biassed normally towards the respective latch engaging means by a spring.

Abutment of the tapered end portion of the or each plunger with the frusto-conical portion of the associated latch member is preferably arranged to urge the latch member towards the latch engaging means.

The plunger may be a tubular piston.

The latch member may alternatively comprise a circlip or snap ring.

The actuator member may comprise a hollow piston.

A spring may be arranged between the actuator member so as to bias the latter normally away from the actuator.

According to a second aspect of the invention there is provided a clutch release mechanism including a fluid actuator having an actuator body supporting an actuator member movable by fluid pressure in the direction to release the clutch, a release bearing assembly for connection to part of the clutch and disengageable coupling means for connecting the release bearing assembly to the actuator member, said coupling means being lockable by fluid pressure to prevent axial separation of the actuator member and the bearing assembly and being unlockable in the absence of said fluid pressure to allow axial separation and coupling of the release bearing assembly and the actuator member. Preferably said coupling means is operable by fluid pressure in said fluid actuator.

According to a third aspect of the invention there is provided a clutch release mechanism including an actuator member movable in the direction to release the clutch, a release bearing assembly for connection to part of the clutch and disengageable coupling means for connecting the release bearing assembly to the actuator member wherein such coupling means is unlockable by fluid pressure to allow axial separation and coupling of the release bearing assembly and the actuator member and is lockable in the absence of fluid pressure to prevent axial separation of the actuator member and the release bearing assembly.

Again, the coupling means may be operable by fluid pressure in said fluid actuator.

In this third aspect of the invention the coupling means may comprise at least one latch member movable for engagement with a respective latch engaging means and at least one unlocking means e.g. a plunger, movable by fluid pressure to urge the or each latch member out of engagement with the respective latch engaging means. The unlocking means may be of a similar construction to the locking means of said one aspect of the invention. Also the or each latch member may be of similar construction to the latch member of said one aspect of the invention and may be urged into engagement with the respective latch engaging means by a spring.

The or each plunger may have a tapered end portion for co-operation with the frusto-conical portion of the associated latch member when each unlocking means is acted upon by fluid pressure to urge the respective pin out of engagement with the associated latch engaging means.

Figure 2:
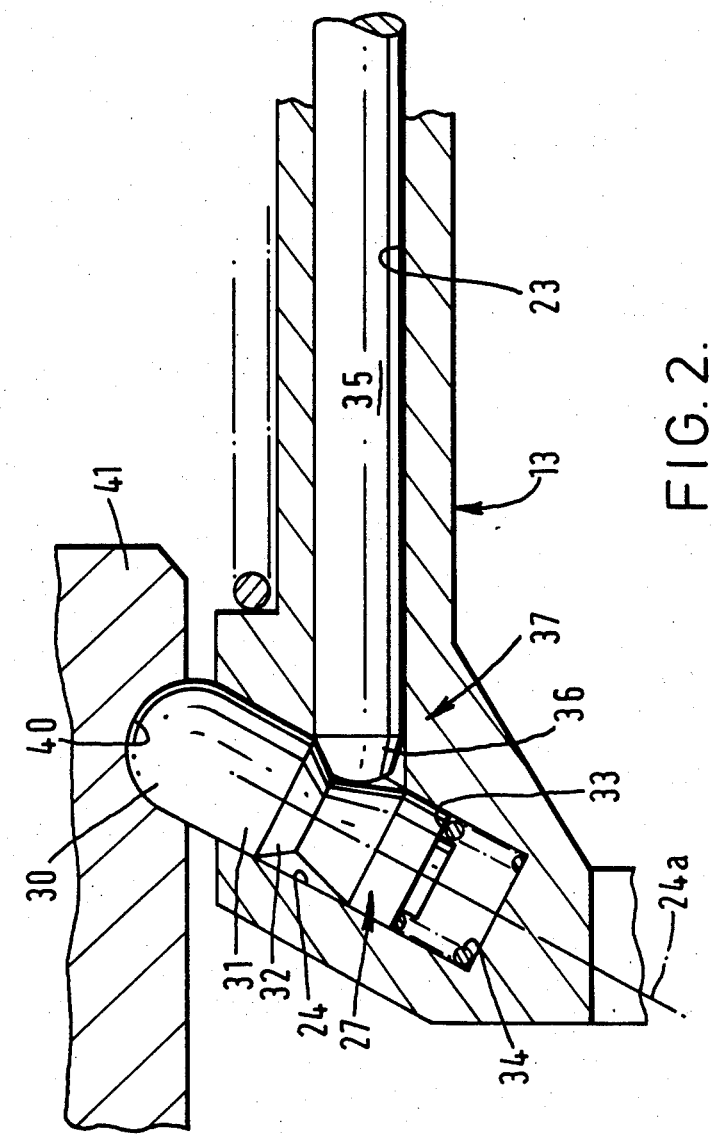

A release mechanism in accordance with the invention will now be described by way of example with reference to the accompanying drawings in which:

FIG. 1 is a cross section through a clutch release mechanism in accordance with the invention, and FIG. 2 is a view to a larger scale of part of the mechanism of FIG. 1.

With reference to FIG. 1 there is shown a fluid actuator 11 having an actuator body 12 supporting an actuator member in the form of a hollow piston 13. The actuator body 12 has a flange 20 at one end for connection to a transmission housing (not shown) of a vehicle and a tubular body 10 defining a cylindrical bore 15. The cylindrical bore 15 is partially closed at one end by an annular end wall 18 through which the hollow piston 13 extends. The hollow piston 13 has a tubular body portion 17, and annular end flange 19, and a thickened end portion 21. The annular end flange 19 is arranged to co-operate with the bore 15 of the actuator body 12 through a seal 22 to define a working chamber 14.

The working chamber 14 is connectable to a fluid pressure supply (not shown) through an inlet passage 25 and threaded connector bore 16.

The tubular body portion 17 has four equispaced ducts 23 extending parallel to the longitudinal axis X of the hollow piston 13.

Each of the ducts 23 is open at one end to the working chamber 14 and at the other end extends into the thickened end portion 21 where it joins a cylindrical cavity 24. Each of the cylindrical cavities 24 extends along an axis 24a inclined to the longitudinal axis X of the hollow piston 13.

Each of the cylindrical cavities 24 supports for sliding motion a latch member in the form of a pin 27 constituting the aforesaid latch member shown in detail in FIG. 2. Each of the pins 27 comprises a part spherical end portion 30, a cylindrical body portion 31, a frusto-conical portion 32 and an annular abutment face 33. For co-operation with a spring 34. Each of the pins 27 is biased by the co-operating spring 34 outwardly for co-operation with a release bearing assembly 42.

The release bearing assembly 42 comprises a first part 41 formed with a circumferential groove 40 which receives the pins 27, a second part 43, a ball thrust bearing 46 interposed between the first and second parts 41 and 43 to allow relative rotation therebetween and a fulcrum ring 44 for reaction against release fingers 45 (shown in broken lines) of a clutch indicated generally at 47 attached to an engine (not shown).

The frusto-conical portion 32 of each pin 27 co-operates with a tapered end portion 36 of a plunger 35 slidable within the adjacent duct 23.

Each of the plungers 35 has a seal 35a near its end adjacent the working chamber 14 and constitutes a fluid operable locking means.

The pins 27, circumferential groove 40 and the plungers 35 together form a disengageable coupling 37 for axially interconnecting the hollow piston 13 and the release bearing assembly 42.

With the release bearing assembly 42 attached to the releasing fingers of the clutch and with the working chamber 14 relieved of pressure, the hollow piston 13 can be coupled to the first part 41 of the release bearing assembly by inserting the hollow piston 13 into the first part 41 by a sufficient distance for the pins 27 to engage the circumferential groove 40. As the hollow piston 13 is pushed into the first part 41 during the coupling operation, each of the pins 27 retracts slightly into the hollow piston 13 against the action of its associated spring 34 through abutment of its part-spherical end portion 30 with a lead-in or chamfer 51 in the first part 41. To stop the hollow piston 13 from being pushed into the actuator body 12 by the application of the force needed to retract the pins 27 (which would effectively prevent retraction of the pins) a return spring 50 of sufficient stiffness is provided. The return spring 50 acts between a shoulder 52 on the outer surface of the hollow piston 13 and an outer surface 53 of the annular end wall 18. If the plungers 35 abut the pins 27 during coupling movement, retraction of the pins causes the frusto conical portions 32 to urge the plungers 35 towards chamber 14.

In the absence of fluid pressure in the working chamber 14 the hollow piston 13 and first part 41 are prevented from axial separation only by the force of springs 34 biasing the pins 27 into the circumferential groove 40. Therefore, it is possible to separate the hollow piston 13 from the first part 41 by moving the actuator body 12 away from the clutch.

If fluid pressure is admitted to the working chamber 14 each of the plungers 35 is moved by the fluid pressure to react against a respective pin 27. The abutment of the tapered end portion 36 of each plunger 35 against the frusto-conical portion 32 of the co-operating pin 27 wedges the part-spherical portion 30 of the pin 27 into the groove 40 thereby axially locking the first part 41 and the hollow piston 13 against axial separation.

Further increasing the fluid pressure in the working chamber 14 will displace the annular end flange 19 of the piston 13 away from the annular end wall 18 in the direction A to release the clutch. The movement of the hollow piston 13 in the direction to release the clutch displaces the release bearing assembly 42 in the same direction, the fulcrum ring 44 reacting against the releasing fingers 45 of the clutch. The releasing force generated by the fluid pressure on the hollow piston 13 is transferred to the release bearing assembly 42 through the pins 27 and groove 40.

Although the invention has been described solely with refence to a hydraulic fluid actuator it could alternatively be applied to a pneumatic actuator.

The arrangement of the release bearing assembly and the hollow piston could be reversed so that the first part of the release bearing engages in the bore of the hollow piston.

The movable latch member could be a snap ring or circlip and not a plurality of separate pins and the plungers 35 could be replaced by a single tubular plunger.

It is also envisaged that the pins 27 may be biased away from the circumferential groove in which case the plungers would not only lock the pins against the groove 40 but would also be required to urge the pins into engagement with the groove.

It is further envisaged that the coupling means could be unlockable by fluid pressure supplied by an external source such as a high pressure air line, in which case the actuator member could be a conventional mechanical lever operable by the driver and the latch member and locking means could be supported by the release bearing assembly. The pins 27 in such a case would be arranged so that when fluid pressure were relieved, the pins would normally prevent separation of the release bearing assembly 42 and actuator member 13. Subsequent application of pressure would then cause tapered end portions of movable members similar to plungers 35 to engage frusto-conical portions of the pins and urge the pins out of engagement with the groove 40.

I claim:

1. A clutch release mechanism for a pull type clutch including a fluid actuator having an actuator member movable by fluid pressure in a clutch release direction to release the clutch, a release bearing assembly for connection to part of the clutch, and coupling means for connecting the release bearing assembly to the actuator, said coupling means comprising a latch member movable by fluid pressure transverse to said direction of clutch release and latch engaging means whereby in a first condition the latch member occupies a position in which it engages the latch engaging means and locks the release bearing assembly axially to the actuator member so that clutch release force applied by said actuator member is transmitted to the release bearing assembly through the latch member to release the clutch, and in a second condition the latch member is disengageable from the latch engaging means to allow axial separation and coupling of the release bearing assembly and the actuator member.

2. A clutch release mechanism as claimed in claim 1 in which in said first condition said latch member is held by fluid pressure in the position in which it locks the release bearing assembly axially to said actuator member.

3. A clutch release mechanism as claimed in claim 2 in which said latch member is held in the position in which it locks the release bearing assembly axially to said actuator member by pressure of fluid which operates said actuator.

4. A clutch release mechanism as claimed in claim 1 in which the latch member is cooperable with a pressure movable element.

5. A clutch release mechanism as claimed in claim 4 in which th latch member is lockable in the position in which it locks the release bearing assembly to the actuator member by said pressure movable element.

6. A clutch release mechanism as claimed in claim 5 in which the pressure movable element is movable into a position cooperable with said latch member in a direction which is substantially parallel with the direction of clutch release.

7. A clutch release mechanism as claimed in claim 5 in which said pressure movable element comprises an axially movable plunger.

8. A clutch release mechanism as claimed in claim 5 in which the pressure movable element is supported by the actuator member.

9. A clutch release mechanism as claimed in claim 8 in which the latch member is mounted on the actuator member.

10. A clutch release mechanism as claimed in claim 6 in which said pressure movable element has a tapered end portion which cooperates with said latch member.

11. A clutch release mechanism as claimed in claim 10 in which said latch member has a frusto conical portion for cooperation with the tapered end portion of the pressure movable element to lock the latch member into the position in which it locks the release bearing assembly axially to the actuator member.

12. A clutch release mechanism as claimed in claim 1 in which said latch member is mounted on said actuator member.

13. A clutch release mechanism as claimed in claim 1 in which said latch engaging means is on said release bearing assembly.

14. A clutch release mechanism as claimed in claim 1 in which said latch member has a part spherical end portion for cooperation with said latch engaging means.

15. A clutch release mechanism as claimed in claim 1 in which the latch member is movable along an axis which is inclined in the direction of clutch release.

16. A clutch release mechanism as claimed in claim 1 in which the latch member is biased normally towards a position in which it locks the release bearing assembly to the actuator member.

17. A clutch release mechanism as claimed in claim 11 in which a plurality of latch members is provided, said latch members being spaced circumferentially between the actuator member and the clutch release bearing assembly.

* * * * *